Patented June 22, 1926.

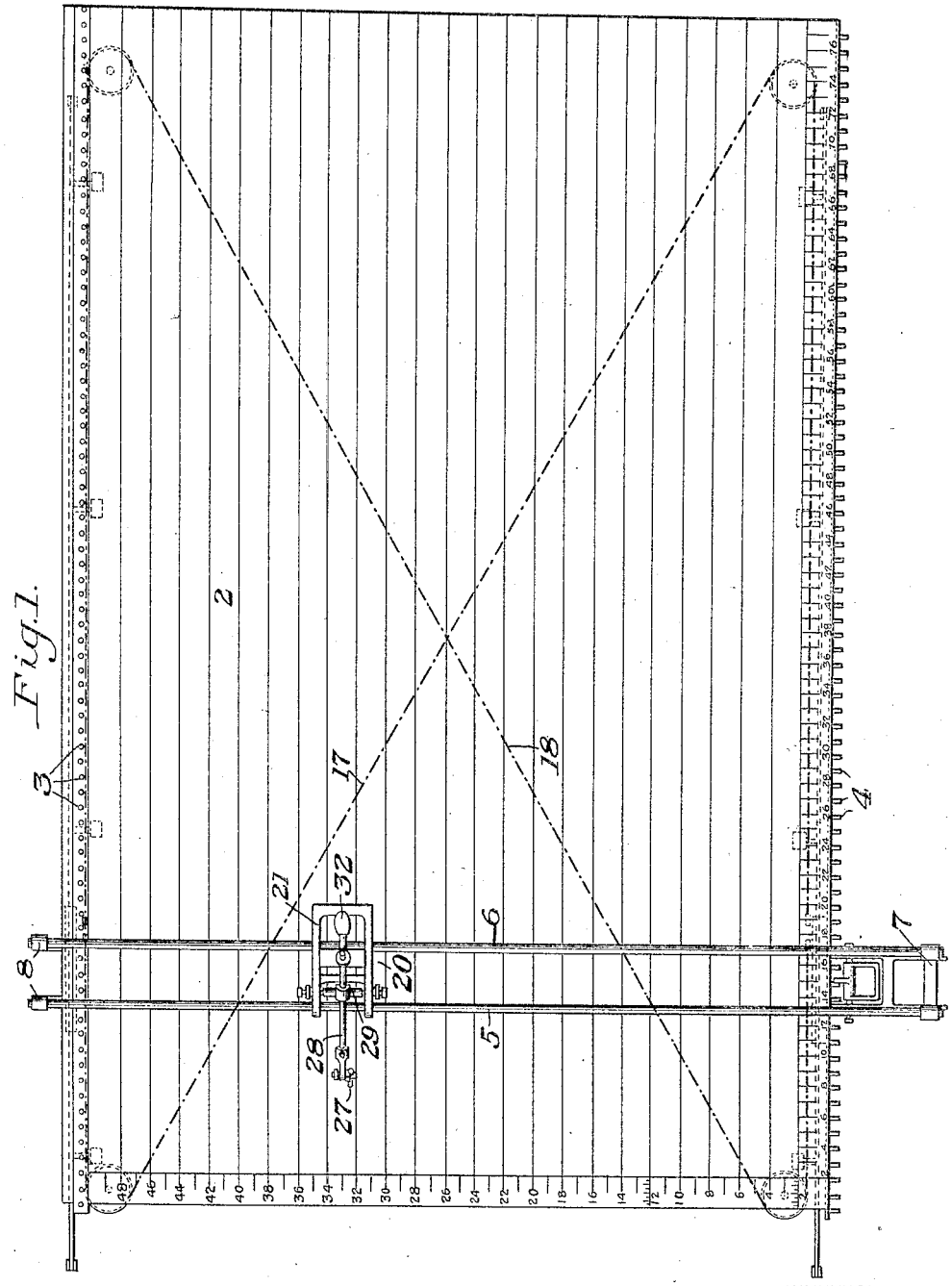

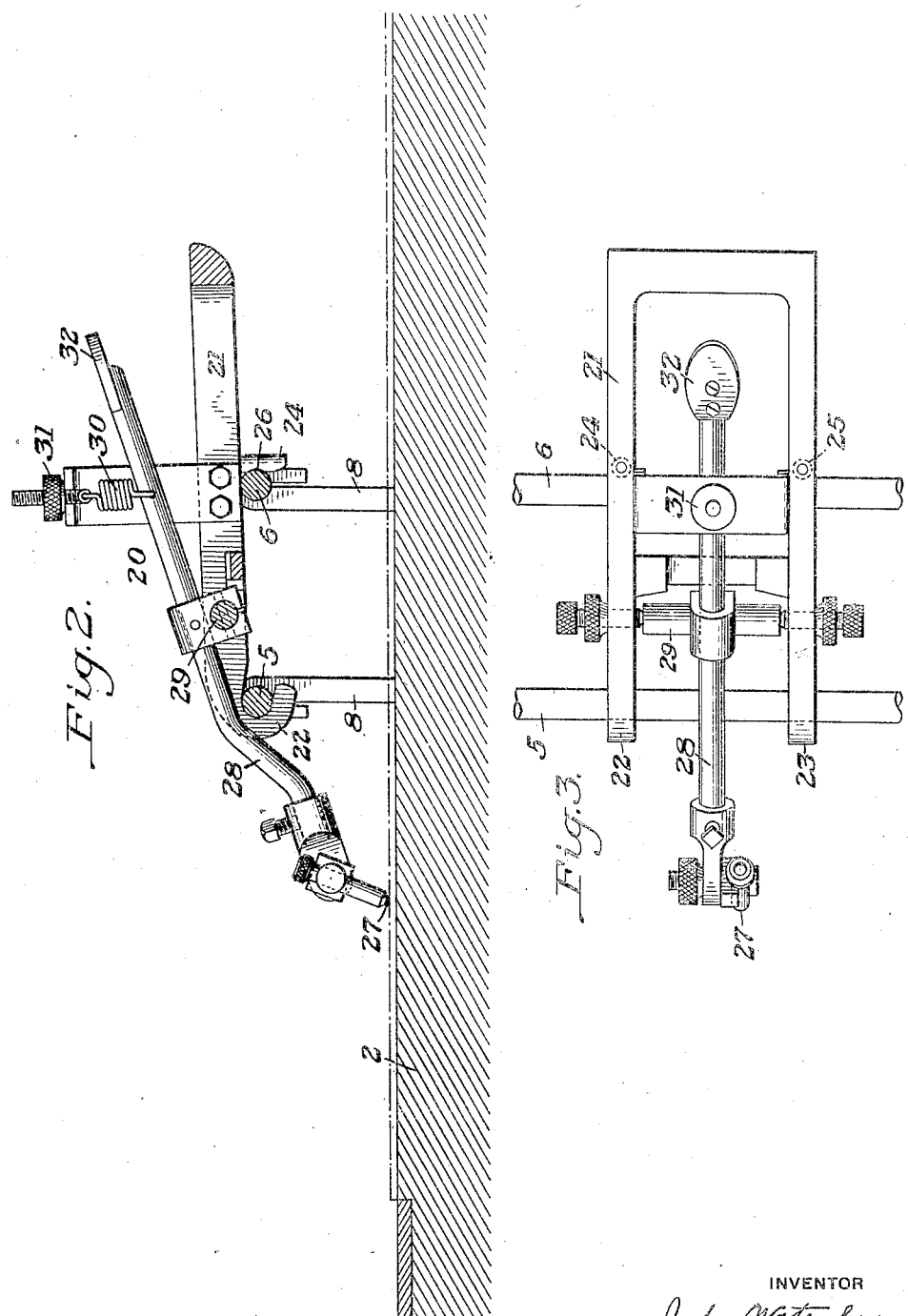

1,589,910

UNITED STATES PATENT OFFICE.

JOHN WATERLOO, OF NEW EAGLE, PENNSYLVANIA, ASSIGNOR TO WINDOW GLASS MACHINE COMPANY, OF PITTSBURGH, PENNSYLVANIA, A CORPORATION OF NEW JERSEY.

GLASS-CUTTING APPARATUS.

Application filed October 28, 1922. Serial No. 597,569.

The present invention relates to glass cutting apparatus and more particularly to apparatus to be used on a glass cutting table for the accurate cutting of plates or sheets of glass.

The invention is shown as embodied in glass cutting apparatus of the general type shown in the Monro & Klages Patent No. 1,178,534. I employ the guide of the Monro & Klages patent but arrange the cutter carriage so that it is held in adjusted position on the guide whereby the guide may be moved longitudinally of the table to make longitudinal cuts in the glass. Also the cutter carriage is preferably made removable.

In the drawings which illustrate the preferred embodiment of the invention, Figure 1 is a plan view of a glass cutting table and the glass cutting apparatus applied thereto;

Figure 2 is a vertical section through the cutter carriage and guide rods; and

Figure 3 is a plan view of the cutter and carriage.

Referring to the illustrated embodiment of the invention the glass cutting apparatus is shown as applied to a glass cutting table 2 of the usual type. The table is provided with the usual series of pins 3 and 4 at its rear and front edges, respectively. The guide or bridge for the cutter carriage is formed of two parallel rods 5 and 6 which span the table and are carried on brackets 7 and 8 movable along the front and back of the table. The guide is provided with equalizer wires 17 and 18 to insure a true parallel movement of the brackets 7 and 8.

The elements above described are those of the Monro & Klages Patent No. 1,178,534, and need not here be described in greater detail.

I replace the cutter carriage shown in the Monro & Klages patent by a cutter carriage which has means for holding it in adjusted position on the guide rods 5 and 6. My cutter carriage is indicated in the drawings generally by reference numeral 20. It comprises a frame 21 having hooked ends 22 and 23 which fit over the guide rod 5. Pins 24 and 25 project downwardly from the frame 21 and engage the side of the guide bar 6. As shown in Figure 2 these pins are slightly hollowed at 26 to fit over the side of the round rod 6 and hold the cutter carriage on the guide rods. There is sufficient elasticity in the guide rods to allow the pins 24 and 25 to be pushed down in place.

The above described construction allows the cutter carriage to be moved back and forth along the guide and the hooked ends 22 and 23 and the pins 24 and 25 serve as means for frictionally holding the cutter in its adjusted position on the guide.

The cutter itself which is illustrated in the drawings as a diamond point 27 is carried on a cutter arm 28 pivoted at 29 on the cutter carriage 20. A spring 30 serves to hold the diamond point 27 against the glass with the desired pressure. An adjusting nut 31 is used to adjust the tension of the spring 30. A finger piece 32 is provided for raising the cutter point 27 during the back travel of the guide.

The cutter carriage is readily removed from the guide rods 5 and 6 and may be replaced by a movable cutter carriage which is arranged to travel longitudinally of the guide rods 5 and 6 and therefore cut transversely of the table. The cutter carriage shown in the drawings is arranged to cut longitudinally of the table. If desired the transverse cuts may be made with the usual hand cutting tool and cutting stick engaging the pins 3 and 4 and now in common use on glass cutting tables.

In cutting glass into squares or rectangular pieces the cutter carriage 20 is slid to its proper adjusted position on the guide rods 5 and 6 and then the guide rods 5 and 6 and brackets 7 and 8 are moved as a whole longitudinally of the table whereby the glass is longitudinally cut. After the proper number of longitudinal cuts have been made the guide rods 7 and 8 may be moved to one end of the table and the transverse cuts made with the usual hand cutting tool and cutting stick.

While the preferred embodiment of the present invention has been specifically illustrated and described, it is to be understood that the present invention is not to be limited to its illustrated embodiment but may be otherwise embodied within the scope of the following claims.

I claim:

1. The combination with a glass cutting table, of a bridge mounted to span the table, a cutter and a cutter support, the bridge comprising a pair of substantially parallel rods and the cutter support having means adapted to be snapped over said rods and make frictional engagement therewith to hold the cutter support at any desired position along the bridge, substantially as described.

2. The combination with a glass cutting table, of a bridge mounted to span the table, a cutter and a cutter support, the bridge comprising a pair of substantially parallel rods, the cutter support comprising a hook adapted to fasten over one of the rods and a post adapted to make snap connection with the other rod to hold the support at adjusted position along the bridge, substantially as described.

In testimony whereof I have hereunto set my hand.

JOHN WATERLOO.